(12) United States Patent
Robinson

(10) Patent No.: US 6,708,896 B2
(45) Date of Patent: Mar. 23, 2004

(54) METHOD AND APPARATUS FOR A RAILROAD CROSSTIE MADE FROM USED TIRES

(76) Inventor: Timothy P. Robinson, 1202 Ferndale, Gurnee, IL (US) 60031

( * ) Notice: Subject to any disclaimer, the term of this patent is extended or adjusted under 35 U.S.C. 154(b) by 0 days.

(21) Appl. No.: 10/208,166

(22) Filed: Jul. 30, 2002

(65) Prior Publication Data

US 2004/0020997 A1 Feb. 5, 2004

(51) Int. Cl.⁷ .............................................. E01B 21/04
(52) U.S. Cl. ...................... 238/84; 156/95; 428/909.3; 238/37
(58) Field of Search .............................. 238/83, 84, 85, 238/29, 31, 37; 156/95, 94, 96, 250, 256, 257, 265; 29/401.1, 403.1; 428/903.3, 56

(56) References Cited

U.S. PATENT DOCUMENTS

| | | | |
|---|---|---|---|
| 4,105,159 A | * | 8/1978 | Brown ........................ 238/36 |
| 4,416,419 A | | 11/1983 | Ohno |
| 5,172,858 A | | 12/1992 | Frohn |
| 5,336,016 A | | 8/1994 | Baatz |
| 5,340,630 A | * | 8/1994 | Tripp .......................... 428/54 |
| 5,464,153 A | | 11/1995 | Broughton |
| 5,605,282 A | | 2/1997 | Snead |
| 5,713,518 A | | 2/1998 | Fox et al. |
| 5,826,791 A | | 10/1998 | Broughton |
| 6,021,958 A | | 2/2000 | Smith |
| 6,179,215 B1 | | 1/2001 | Shea |
| 6,247,651 B1 | | 6/2001 | Marinelli |
| 6,368,690 B1 | * | 4/2002 | Bove ........................ 428/56 |
| 6,372,069 B1 | * | 4/2002 | Walls ........................ 156/95 |

OTHER PUBLICATIONS 3 page sales brochure : Lakin Engineered Components for Orignal Equipment Manufacturers; Ticor—Synthetic Fiber Reinforced Rubber Material.

* cited by examiner

Primary Examiner—S. Joseph Morano
Assistant Examiner—Frantz F. Jules
(74) Attorney, Agent, or Firm—Michael R. McKenna

(57) ABSTRACT

A method and apparatus for a railroad crosstie made from used tires. The tires are cut radially and the sidewalls are removed. Longitudinal and lateral cuts along the inner surface are preferably made to facilitate flattening. Opposing inner surfaces are joined as sets and then stacked and bundled to form a railroad crosstie.

24 Claims, 2 Drawing Sheets

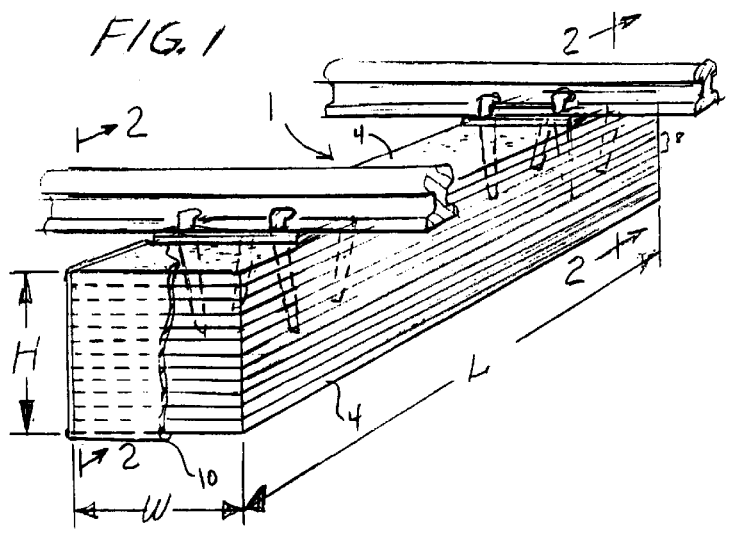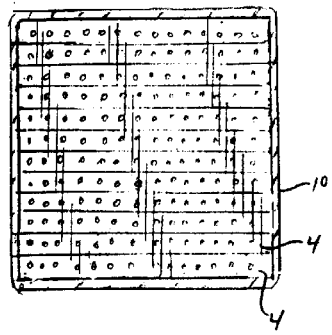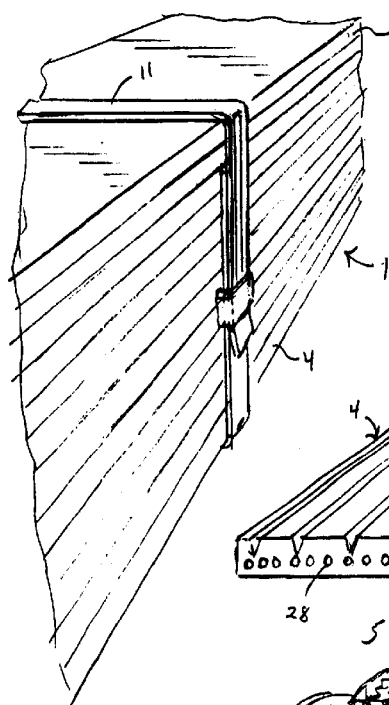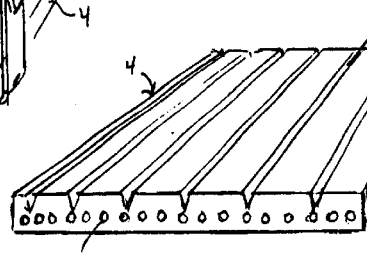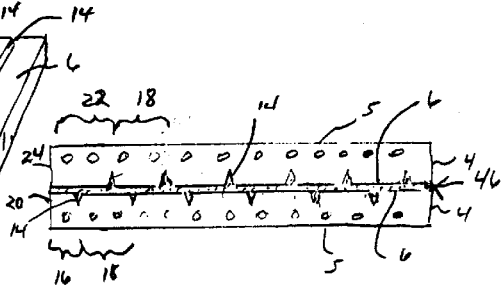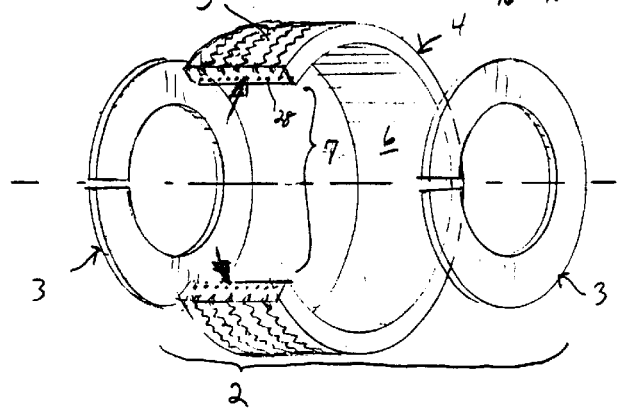

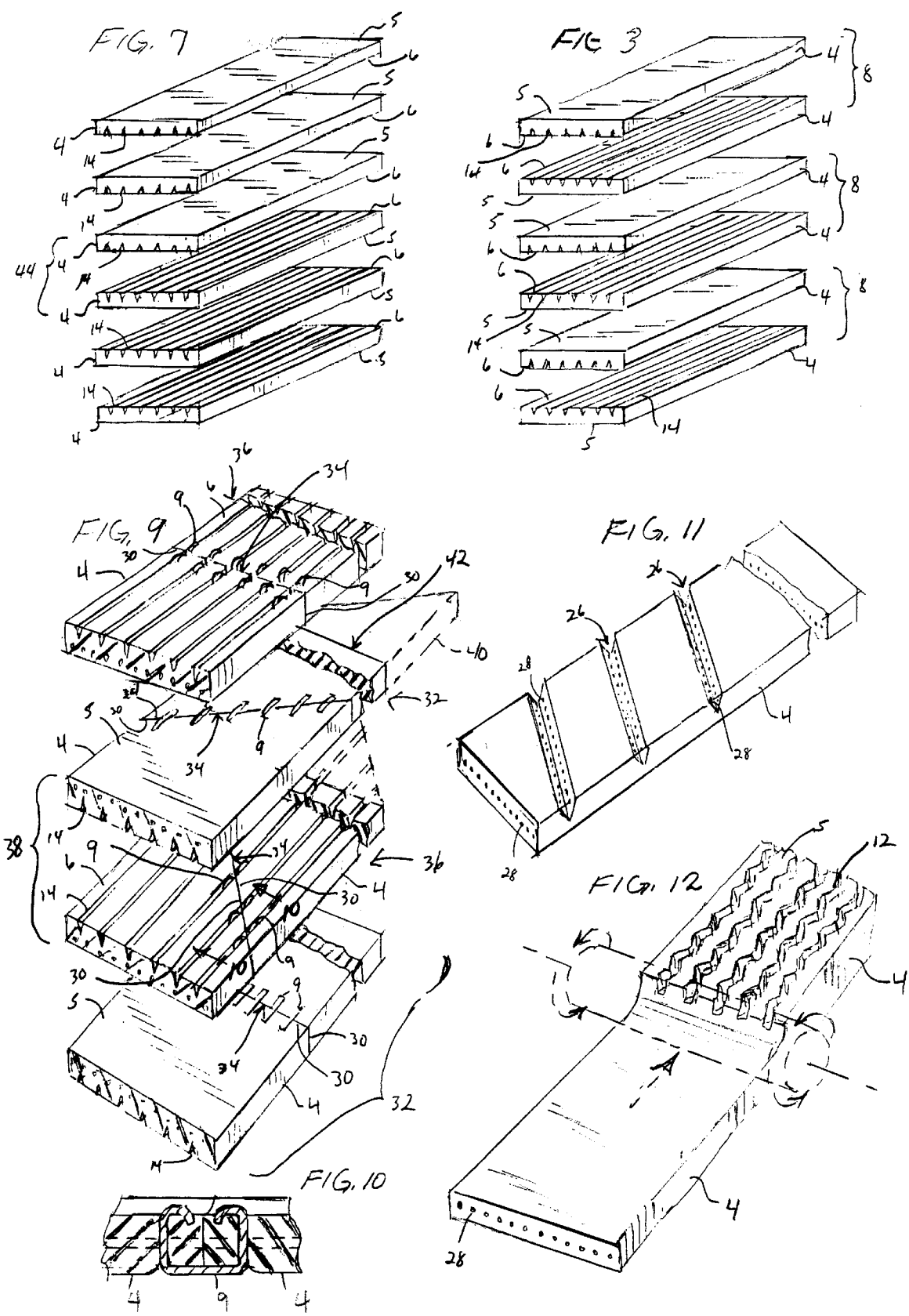

METHOD AND APPARATUS FOR A RAILROAD CROSSTIE MADE FROM USED TIRES

BACKGROUND OF THE INVENTION

This invention relates to a method and apparatus for a railroad crosstie made from used tires. Each tire is severed with a radial cut and the sidewalls are removed. Longitudinal and lateral cuts along the inner surface may be made to facilitate flattening. Opposing inner surfaces are joined in sets and then stacked and bundled to form a railroad crosstie.

Alternative technology is available in the form of a railroad crosstie which includes an I-beam member made of a combination of recycled materials, including crumb rubber. See U.S. Pat. No. 6,247,651 issued on Jun. 19, 2001 to Marinelli and U.S. Pat. No. 6,179,215 issued on Jan. 30, 2001 to Shea. Also see U.S. Pat. Nos. 6,021,958 issued in 2000 to Smith; U.S. Pat. No. 5,336,016 issued in 1994 to Baatz; U.S. Pat. No. 5,172,858 issued to Frohn in 1992; and U.S. Pat. No. 4,416,419 issued in 1983 to Ohno all for railroad crossties employing recycled elastic materials.

Also see U.S. Pat. Nos. 5,464,153, 5,605,282 and 5,826,791, in which a used tire is modified and employed as a rail support; and U.S. Pat. No. 3,893,619 for a crosstie comprising an elongated block of rubber between end plates connected by rods, where the rubber block is produced from tire grindings. Another is U.S. Pat. No. 4,108,377 for a nonmetallic reinforced molded crosstie having wooden reinforcing members.

A disadvantage to all of the foregoing devices is that they require a variety of additional components and are costly to produce. Additionally, they fail to use most of the used tire itself.

While die cut recycled tires have been used in consumer products and construction equipment for transmitting torque, absorbing vibration, sealing gaps against granular leakage, and conveying and spreading materials, because of their ability to withstand cyclical flexing and allow for thermal expansion and contraction, the variety of shapes and sizes has been limited to thicknesses of 0.750 inches. (See two page TICOR Synthetic Fiber Reinforced Rubber Material specification.) See also Japanese Patent, JP 6-2301 where a used tire is cut, laid flat and bonded to the bottom surface of a concrete sleeper, and German Patent, No. 3338-222 for a universal layered elastic rail mounting including a series of rubber units disposed between a plate and a cover plate. Unfortunately, the nature of tires provides an inherent circumferential curvature about the tire axis which is reinforced by the circumferential belts or cords and an axial curvature of the central initially treaded section disposed between the sidewalls is inherent as well.

To alleviate these problems, and others which will become apparent from the disclosure which follows, the present invention conveniently places incisive cuts to facilitate flattening of the central initially treaded section. Moreover, in several embodiments, the apparatus and method provide for inner surfaces of the central initially treaded sections to be disposed in a face to face relationship, thus exerting opposing forces to facilitate flattening. Moreover, the method of the invention described provides that inter-layer adhesives may be applied to maintain the face to face relationship of the various layers. Banding the layers together further facilitates the relationship above described.

Additionally, the invention provides a method of utilizing smaller tires whose circumference are less than the required length of a standard railroad crosstie. As a result, the instant invention teaches means for a railroad crosstie which can be substituted for existing wood crosstie in a size generally 8.5 feet in length, 8 inches in height, and 7.75 inches in width from a variety of initial tire sizes and dimensions. This new stable yet resilient crosstie will last for years beyond the wooden ties currently being used.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach crossties created from the crumb rubber of ground used tires, the current invention uses the circumferential belts (cords) as well. New manufacturing techniques disclosed in the method of making railroad crossties comprises means for maintaining a flattened layer including longitudinal cuts on the inner surface of the central initially treaded section that do not extend all the way through the central initially treaded section to reduce the lateral curvature of the central initially treaded section, and transverse cuts through at least some of the circumferential belts to reduce longitudinal curvature of the central initially treaded section. These incisive cuts facilitate flattening of the central initially treaded section.

Additionally, the apparatus and methods disclosed herein provide for inner surfaces of the central initially treaded sections to be disposed in a face to face relationship where the inherent lateral and longitudinal curvature forces can be placed in opposition to facilitate flattening.

It is anticipated that while a wood tie is designed to lasts approximately 13 years and are left in place generally twice that long, the fabricated recycled tire crosstie of this invention will last for approximately 75 years. Moreover, the railway crossties made today are made of treated wood timbers. These crossties are 229 mm. wide×138 mm. high and generally 259:2 cm long. The treatment used in the wood crossties can be creosote, chromated copper arsenic, and other environmentally harmful chemicals. The weathering affect on these wood crossties spoils the surrounding soil. This environmental problem is obviated by the current invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a method and apparatus for a railroad crosstie made from a plurality of tires. The method provides for cutting through a radial sector of each of said plurality of tires, removing the sidewalls from a central initially treaded section, and aligning an inner surface of the central initially treaded section of one of said plurality of tires in a face to face relationship with an inner surface of another of said plurality of tires to form an opposing set. A plurality of opposing sets are then stacked and bundled to form a railroad crosstie.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a perspective view of a railroad crosstie of the current invention shown supporting a pair of rails with the crosstie having a plurality of flattened tire layers bundled together and provided with a covering;

FIG. 2 is a cross-sectional view of a railroad crosstie taken along line 2—2 of FIG. 1 showing a face of the plurality of flattened tire layers bundled together and encased in a covering;

FIG. 3 is a perspective view of a railroad crosstie of the current invention showing one of the at least one straps for bundling;

FIG. 4 is a perspective view of one of the plurality of tires that has been cut through a radial sector with the sidewalls removed from the central initially treaded section and with a plurality of longitudinal cuts on the inner surface of the central initially treaded section that do not extend all the way through the central initially treaded section;

FIG. 5 is a side elevation view of an end of an opposing set of two central initially treaded sections aligned with the inner surfaces in a face to face relationship and with an adhesive disposed there between;

FIG. 6 is a perspective view of one of the plurality of tires that has a cut through a radial sector and with the sidewalls removed from the central initially treaded section;

FIG. 7 is an exploded perspective view of a core set of the central initially treaded sections of two tires with the inner surfaces aligned in a face to face relationship and with the inner surface of another of the plurality of tires in a face to face relationship with one of the two outer surfaces of the core set and the inner surface of one other of the plurality of tires in a face to face relationship with the other of the two outer surfaces of the core set;

FIG. 8 is an exploded perspective view of a plurality of opposing sets in a stacked arrangement;

FIG. 9 is an exploded perspective view of the railroad crosstie of the instant invention showing a cut end of a first one of the plurality of tires attached to a cut end of a second one of the plurality of tires with the inner surface of each of the first one and the second one of the plurality of tires facing in the same direction to form an extended first layer, wherein the cut end of the first one of the plurality of tires and the cut end of the second one of the plurality of tires to which it is attached constitutes an attachment joint of the extended first layer and in phantom, removal of a diagonal end is indicated;

FIG. 10 is a cross-sectional view taken along the line 10—10 of FIG. 9, showing the use of a staple to secure the attachment joint;

FIG. 11 is a perspective view of one of the plurality of central initially treaded sections having a plurality of circumferential belts disposed between the outer surface and the inner surface with at least one cut that extends into the plurality of circumferential belts and does not extend all the way through the central initially treaded section; and FIG. 12 is a perspective view of one of the plurality of central initially treaded sections with at least a portion of the outer treaded surface being removed.

DETAILED DESCRIPTION OF THE INVENTION

An apparatus for and method of making a railroad crosstie from a plurality of tires is taught by this important invention. Each of the plurality of tires has sidewalls and a central initially treaded section with an outer treaded surface and an inner surface. The method comprises cutting through a radial sector of each of the plurality of tires, removing the sidewalls from the central initially treaded section, flattening the central initially treaded section of the plurality of tires, stacking the plurality of flattened tires, and bundling them to form a railroad crosstie.

Without departing from the generality of the invention disclosed herein and without limiting the scope of the invention, the discussion that follows, will refer to the invention as depicted in the drawing.

The preferred embodiments of the apparatus depicted in the drawing comprise a method of making a railroad crosstie 1 from a plurality of new or used tires 2 is taught by this important invention. The tires will most typically be used vehicle tires made of various forms of material including rubber. Each of the plurality of tires has sidewalls 3 and a central initially treaded section 4 with an outer treaded surface 5 and an inner surface 6. The method comprises cutting through a radial sector 7 (shown expanded in the direction of the arrows in FIG. 6) of each of the plurality of tires 2, removing the sidewalls 3 from the central initially treaded section 4 of each of the plurality of tires, aligning the inner surface 6 of the central initially treaded section 4 of one of the plurality of tires in a face to face relationship with the inner surface 6 of another of the plurality of tires to form an opposing set 8, making a plurality of opposing sets, stacking the plurality of opposing sets, and bundling the plurality of opposing sets to form a railroad crosstie.

The radial sector may be one of infinitely small arc angle, such as a thin radial cut, or a larger sector which can accommodate cuts transverse to the axis of the tire or sectors which have angle of greater degrees, which would result in the removal of a larger segment of the tire, leaving a tire layer of less length than the circumference of the unprocessed tire. The bundling may be accomplished with steel, or suitable plastic strap 11. The bundling technique contemplated may utilize a nylon webbing (like that used in lawn chairs), metal banding, and in either case the banding will be flat which will provide less of a likelihood of cutting through the tires or the covering.

The method may also include removing at least a portion of the outer tread surface 12 from the central initially treaded section, as shown in FIG. 12.

A preferred step is making at least one longitudinal cut 14 on the inner surface 6 of the central initially treaded section of at least one of the plurality of tires, the at least one longitudinal cut does not extend all the way through the central initially treaded section 4. Some of the at least one longitudinal cut may not extend along the entire length of the central initially treaded section, i.e. partial or intermittent longitudinal cuts may be employed. See FIG. 4. Additionally, the following steps, as shown in FIG. 5, may be provided:

a. a first of the at least one longitudinal cut 14 is disposed at a first predetermined distance 16 from a first longitudinal edge 20 of the central initially treaded section 4 of one of the plurality of tires 2 and each other one of the at least one longitudinal cut 14 is disposed at a second predetermined distance 18 from an adjacent one of the at least one longitudinal cut;

b. an initial one of the at least one longitudinal cut 14 is disposed at a primary predetermined distance 22 from a primary longitudinal edge 24 of the central initially treaded section 4 of another one of the plurality of tires 2 and each other one of the at least one longitudinal cut is disposed at the second predetermined distance 18 from an adjacent one of the at least one longitudinal cut; and c. the inner surface 6 of the central initially treaded section of the one of the plurality of tires that is disposed in a face to face relationship with the inner surface 6 of the another one of the plurality of tires to form an opposing set 8 has the first longitudinal edge 20 adjacent to the primary longitudinal edge 24 with the at least one longitudinal cut 14 of the one of the plurality of tires interpolatively offset to the at least one longitudinal cut of the another one of the plurality of tires along the face to face relationship.

Another step of the method of making a railroad crosstie may include making at least one cut 26 that extends into a plurality of circumferential belts 28 disposed in the central initially treaded section 4, the at least one cut does not extend all the way through the central initially treaded section, as best shown in FIG. 11. More specifically FIG. 11 shows the making of at least one oblique angled cut 26 that extends into a plurality of circumferential belts 28 disposed in the central initially treaded section 4 and does not extend all the way through the central initially treaded section may be employed. It is preferred that steel belts, for example, be cut every 3 inches. Moreover, it is preferred that these cuts be made on a 45° angle relative to the belt or cord. Typically, the depth of the cut is approximately ⅛" leaving about 3/32 of an inch of tire without a cut.

Additionally, where tires having varying belt compositions are employed, such as steel and nylon belts, it is preferred that the central initially treaded section containing steel belts be interpolated with central initially treaded sections containing nylon belts. Furthermore, when both extended layers, having two central initially treaded sections attached together, and single central initially treaded section layers are employed in a crosstie, interspersing one with the other will provide an overall stronger crosstie.

To accomplish uniformity in the width of the railroad crosstie 1, a process may be employed that removes the sidewalls 3 from the central initially treaded section 4 in a way which trims the width of the central initially treaded section 4 to a predetermined width.

One of the methods of making a railroad crosstie of uniform length employing cutting through a radial sector of each of the plurality of tires comprises trimming the length of the central initially treaded section 4 to a predetermined length. In one preferred embodiment of the method of making a railroad crosstie, cutting through a radial sector may comprises removing a ring sector of each of the plurality of tires so that the circumferential length of a remaining ring sector is uniform for each of the plurality of tires. The cutting through a radial sector may comprise a radial cut through at least one of the plurality of tires as shown in FIG. 6. Another method includes cutting off at least one exposed end of the railroad crosstie to reduce the length of the railroad crosstie to a predetermined length.

To facilitate bundling, the plurality of opposing sets that are stacked may be pressed together.

As shown in FIG. 5, the method of making a railroad crosstie may further comprise applying an adhesive between at least a first central initially treaded section and another central initially treaded section.

Referring to the middle two layers of FIG. 9, the railroad crosstie of the instant invention may be made by cutting through a radial sector comprises making a cut that is transverse to an axis of the tire being cut to form a pair of diagonal ends. Each of the pair of diagonal ends may be one of a forward diagonal and a backward diagonal. The process includes removing each of the pair of diagonal ends. Preferably, the transverse cut is made on a 45° angle.

As best shown in FIGS. 1 and 2, a preferred method includes coating the railroad crosstie. A water resistant oil based coating will suffice, but one quarter inch neoprene coating is preferred to prevent deterioration of tire rubber and banding (steel belts will rust).

A typical wood railroad cross tie is 8.5 feet long, 7.75 inches wide, and 8 inches high. A smaller tire that is less than approximately 16.23 inches in radius will not be long enough to make a railroad cross tie 8.5 feet in length. It will have to be joined with another tire. The instant invention teaches a method of making a railroad crosstie from a plurality of smaller tires. This method comprises:

a. cutting through a radial sector of each of the plurality of tires 2;

b. removing the sidewalls 3 from the central initially treaded section 4 of each of the plurality of tires;

c. attaching a cut end 30 of a first one of the plurality of tires 2 to a cut end 30 of a second one of the plurality of tires 2 with the inner surface 6 of each of the first one and the second one of the plurality of tires facing in the same direction to form an extended first layer 32, wherein the cut end of the first one of the plurality of tires and the cut end of the second one of the plurality of tires to which it is attached constitutes an attachment joint 34 of the extended first layer;

d. attaching a cut end 30 of a third one of the plurality of tires 2 to a cut end 30 of a fourth one of the plurality of tires 2 with the inner surface 6 of each of the third one and the fourth one of the plurality of tires facing in the same direction to form an extended second layer 36, wherein the cut end of the third one of the plurality of tires and the cut end of the fourth one of the plurality of tires to which it is attached constitutes an attachment joint 34 of the extended second layer 36;

e. aligning the inner surface 6 of the extended first layer 32 in a face to face relationship with the inner surface 6 of the extended second layer 36 to form an extended opposing set 38;

f. making a plurality of extended opposing sets;

g. stacking the plurality of extended opposing sets; and h. bundling the plurality of extended opposing sets to form a railroad crosstie.

As shown in FIGS. 9 and 10, the attachment joint 34 may be secured with staples 9.

The attachment joint 34 of the extended first layer 32 and the attachment joint 34 of the extended second layer 36 may be disposed medially. As shown in FIG. 9, the attachment joints of adjacent layers with the inner surfaces facing one another may crisscross when overlapped. This arrangement provides additional compressive strength.

Additionally, a pair of diagonal ends 40 may be formed by the method of cutting through a radial sector comprising a planar cut in each of the plurality of tires that lies in a plane which excludes an axis of the tire being cut. See FIG. 9. Removing each of the pair of diagonal ends 40 that are disposed at each end of the extended first layer 34 and the extended second layer 36 will provide the customary flat end 42 of the crosstie that is generally desired. Additionally, by removing an end portion (a diagonal end 40) of at least one of the extended first layer 32 and the extended second layer 36, the length of the extended first layer approaches the length of the extended second layer. Furthermore, cutting off at least one exposed end of the railroad crosstie reduces the length of the railroad crosstie to a predetermined length.

Uniformity of crosstie thickness may be achieved by the thickness of the central initially treaded section 4 of each tire. This may be accomplished by removing at least a portion of the outer tread surface from the central initially treaded section, as shown in FIG. 12. Additionally, control of the number of layers in the crosstie will affect thickness.

In a method of making a railroad crosstie of a first length from a plurality of tires of varying diameters, the following steps may be employed:

a. cutting through a radial sector of each of the plurality of tires 2;

b. removing the sidewalls 3 from the central initially treaded section 4 of each of the plurality of tires 2;

c. determining whether a projected flat length of each of the central initially treaded section of each of the plurality of tires is equal to, greater than, or smaller than the first length of a railroad crosstie;

d. aligning the inner surface 6 of the central initially treaded section 4 of one of the plurality of tires 2 with a projected flat length that is equal to or greater than the first length of a railroad crosstie in a face to face relationship with the inner surface 6 of another of the plurality of tires 2 with a projected flat length that is equal to or greater than the first length of a railroad crosstie to form an opposing set;

e. making a plurality of opposing sets 8;

f. attaching a cut end 30 of a first one of the plurality of tires 2 having a projected flat length that is smaller than the first length of a railroad crosstie to a cut end 30 of a second one of the plurality of tires 2 having a projected flat length that is smaller than the first length of a railroad crosstie with the inner surface 6 of each of the first one and the second one of the plurality of tires facing in the same direction to form an extended first layer 32, wherein the cut end 30 of the first one of the plurality of tires and the cut end 30 of the second one of the plurality of tires to which it is attached constitutes an attachment joint 34 of the extended first layer 32;

g. attaching a cut end 30 of a third one of the plurality of tires 2 having a projected flat length that is smaller than the first length of a railroad crosstie to a cut end 30 of a fourth one of the plurality of tires 2 having a projected flat length that is smaller than the first length of a railroad crosstie with the inner surface 6 of each of the third one and the fourth one of the plurality of tires 2 facing in the same direction to form an extended second layer 36, wherein the cut end of the third one of the plurality of tires and the cut end of the fourth one of the plurality of tires to which it is attached constitutes an attachment joint of the extended second layer;

h. aligning the inner surface 6 of the extended first layer 32 in a face to face relationship with the inner surface 6 of the extended second layer 36 to form an extended opposing set 38;

i. making a plurality of extended opposing sets;

j. interpolatively stacking the plurality of opposing sets with the plurality of extended opposing set to form a interpolated stack; and k. bundling the interpolated stack to form a railroad crosstie.

Furthermore, the step of reducing the length of each opposing set and each extending opposing set to the first length of a railroad crosstie may be used.

Another method of making a railroad crosstie from a plurality of tires 2 is shown in FIG. 7, with each of the plurality of tires having sidewalls 3 and a central initially treaded section 4 with an outer treaded surface 12 and an inner surface 6, comprises:

a. cutting through a radial sector of each of the plurality of tires;

b. removing the sidewalls from the central initially treaded section of each of the plurality of tires;

c. removing at least a portion of the outer tread surface 12 from the central initially treaded section 4;

d. aligning the inner surface 6 of the central initially treaded section 4 of a first one of the plurality of tires in a face to face relationship with the inner surface 6 of a second one of the plurality of tires 2 to form a core set 44 having two outer surfaces 5;

e. aligning the inner surface 6 of the central initially treaded section of another of the plurality of tires in a face to face relationship with one of the two outer surfaces 5 of the core set 44, and aligning the inner surface 6 of the central initially treaded section of one other of the plurality of tires in a face to face relationship with the other of the two outer surfaces 5 of the core set 44;

f. repeating the forgoing step a predetermined number of times to form an expanded core set; and g. bundling the expanded core set to form a railroad crosstie.

Another preferred method of making a railroad crosstie 1 from a plurality of tires 2 comprises:

a. cutting through a radial sector 7 of each of the plurality of tires 2;

b. removing the sidewalls 3 from the central initially treaded section 4 of each of the plurality of tires;

c. removing at least a portion of the outer tread surface 12 from the central initially treaded section 4;

d. aligning the inner surface 6 of one of the plurality of tires 2 in a face to face relationship with another of the plurality of tires to form an opposing set 8;

e. repeating the forgoing step to form a plurality of opposing sets 8;

f. stacking the plurality of opposing sets; and g. bundling the plurality of opposing sets to form a railroad crosstie.

As shown in FIG. 11, an additional method of making a railroad crosstie from a plurality of tires, each of the plurality of tires having sidewalls and a central initially treaded section with an outer treaded surface, an inner surface, and a plurality of circumferential belts 28 disposed there between, comprises:

a. cutting through a radial sector of each of the plurality of tires 2;
   b. removing the sidewalls from the central initially treaded section of each of the plurality of tires;
   c. making at least one cut that extends into the plurality of circumferential belts 28 and does not extend all the way through the central initially treaded section 4;
   d. stacking the plurality of each of the plurality of tires; and
   e. bundling the plurality of opposing sets to form a railroad crosstie.

In yet another method of making a railroad crosstie from a plurality of tires 2, each of the plurality of tires having sidewalls and a central initially treaded section with an outer treaded surface and an inner surface, comprising:

a. cutting through a radial sector 7 of each of the plurality of tires;
   b. removing the sidewalls from the central initially treaded section of each of the plurality of tires;
   c. making at least one longitudinal cut 14 on the inner surface 6 of the central initially treaded section 4 of each of the plurality of tires, the at least one longitudinal cut does not extend all the way through the central initially treaded section;
   d. stacking the plurality of each of the plurality of tires; and
   e. bundling the plurality of opposing sets to form a railroad crosstie, as shown in FIG. 4.

Stacking the plurality of each of the plurality of tires 2 may comprise aligning the inner surface 6 of the central initially treaded section of a first one of the plurality of tires in a face to face relationship with the inner surface 6 of a second one of the plurality of tires to form a core set 44 having two outer surfaces 5, aligning the inner surface 6 of the central initially treaded section of another of the plurality of tires in a face to face relationship with one of the two outer surfaces 5 of the core set 44, and aligning the inner surface 6 of the central initially treaded section of one other of the plurality of tires in a face to face relationship with the other of the two outer surfaces 5 of the core set 44, and repeating the forgoing step to form an expanded core set.

An apparatus for a railroad crosstie 1, as shown in FIG. 1, comprising a plurality of tires 2, with each of the plurality of tires having sidewalls removed, a central initially treaded section 4 with an outer surface 5 and an inner surface 6, and a cut through a radial sector thereof, so that the inner surface of the central initially treaded section of one of the plurality of tires can be aligned in a face to face relationship with the inner surface of another of the plurality of tires to form one of a plurality of opposing sets 8, and with each of the plurality of opposing sets being stacked and bundled together.

The apparatus for the railroad crosstie may include at least a portion of the outer tread surface from the central initially treaded section being removed, as shown in FIG. 12. Additionally, at least one longitudinal cut 14 on the inner surface 6 of the central initially treaded section 4 of at least one of the plurality of tires 2 may be made, with the at least one longitudinal cut 14 not extending all the way through the central initially treaded section, as shown in FIG. 4. Furthermore, at least one cut 26 that extends into a plurality of circumferential belts 28 disposed in the central initially treaded section 4 may be made to at least one of the plurality of tires 2, with the at least one cut 26 does not extend all the way through the central initially treaded section 4, as shown in FIG. 11. The apparatus for the railroad crosstie may further include one or both of a covering 10 and an adhesive 46 disposed between adjacent central initially treaded sections, as shown in FIG. 5.

A preferred apparatus for a railroad crosstie comprising a plurality of tires, with each of the plurality of tires has sidewalls removed, a central initially treaded section with an outer treaded surface and an inner surface, and a cut through a radial sector thereof, so that a cut end of a first one of the plurality of tires is attached to a cut end of a second one of the plurality of tires with the inner surface of each of the first one and the second one of the plurality of tires facing in the same direction to form an extended first layer, wherein the cut end of the first one of the plurality of tires and the cut end of the second one of the plurality of tires to which it is attached constitutes an attachment joint of the extended first layer, and a cut end of a third one of the plurality of tires is attached to a cut end of a fourth one of the plurality of tires with the inner surface of each of the third one and the fourth one of the plurality of tires facing in the same direction to form an extended second layer, wherein the cut end of the third one of the plurality of tires and the cut end of the fourth one of the plurality of tires to which it is attached constitutes an attachment joint of the extended second layer, and the inner surface of the extended first layer is aligned in a face to face relationship with the inner surface of the extended second layer to form a plurality of extended opposing set. Each of the plurality of extended opposing sets may be stacked and bundled together. Furthermore, at least one staple may be employed to secure the attachment joint.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scop of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of making a railroad crosstie from a plurality of tires, each of said plurality of tires having sidewalls and a central initially treaded section with an outer treaded surface and an inner surface, comprising:
   a. making a first cut through a radial sector at the side of each of said plurality of tires;
   b. removing the sidewalls from the central initially treaded section of each of said plurality of tires;
   c. removing at least a portion of the outer tread surface from the central initially treaded section;
   d. aligning the inner surface of the central initially treaded section of one of said plurality of tires in a face to face relationship with the inner surface of another of said plurality of tires to form an opposing set;
   e. making a plurality of the opposing sets;
   f. stacking the plurality of the opposing sets; and
   g. bundling the plurality of the opposing sets to form the railroad crosstie.

2. The method of making a railroad crosstie of claim 1, further comprising making a second cut including at least one cut that extends into a plurality of circumferential belts disposed in the central initially treaded section, said second cut does not extend all the way through the central initially treaded section.

3. The method of making a railroad crosstie of claim 1, further comprising making a third cut including at least one oblique angled cut that extends into a plurality of circumferential belts disposed in the central initially treaded section, said third cut does not extend all the way through the central initially treaded section.

4. The method of making a railroad crosstie of claim 1, further comprising applying an adhesive between at least a first central initially treaded section and another central initially treaded section.

5. The method of making a railroad crosstie of claim 1, wherein making a first cut through a radial sector at the side comprises making a cut that is transverse to an axis of the tire being cut to form a pair of diagonal ends.

6. The method of making a railroad crosstie of claim 5, wherein each of the pair of diagonal ends is one of a forward diagonal and a backward diagonal.

7. The method of making a railroad crosstie of claim 6, further comprising removing each of the pair of diagonal ends.

8. The method of making a railroad crosstie of claim 1, further comprising coating the railroad crosstie.

9. A method of making a railroad crosstie from a plurality of tires, each of said plurality of tires having sidewalls and a central initially treaded section with an outer treaded surface and an inner surface, comprising:
   a. making a first cut through a radial sector at the side of each of said plurality of tires;
   b. removing the sidewalls from the central initially treaded section of each of said plurality of tires;
   c. making at least one longitudinal cut on the inner surface of the central initially treaded section of at least one of the plurality of tires, said at least one longitudinal cut does not extend all the way through the central initially treaded section;
   d. aligning the inner surface of the central initially treaded section of one of said plurality of tires in a face to face relationship with the inner surface of another of said plurality of tires to form an opposing set;
   e. making a plurality of the opposing sets;
   f. stacking the plurality of the opposing sets; and
   g. bundling the plurality of the opposing sets to form the railroad crosstie.

10. The method of making a railroad crosstie of claim 9, wherein
   a. a first of said at least one longitudinal cut is disposed at a first predetermined distance from a first longitudinal edge of the central initially treaded section of one of said plurality of tires and each other one of said at least one longitudinal cut is disposed at a second predetermined distance from an adjacent one of said at least one longitudinal cut;
   b. an initial one of said at least one longitudinal cut is disposed at a primary predetermined distance from a primary longitudinal edge of the central initially treaded section of another one of said plurality of tires and each other one of said at least one longitudinal cut is disposed at the second predetermined distance from an adjacent one of said at least one longitudinal cut; and
   c. the inner surface of the central initially treaded section of said one of the plurality of tires that is disposed in a face to face relationship with the inner surface of said another one of said plurality of tires to form an opposing set has the first longitudinal edge adjacent to the primary longitudinal edge with the at least one longitudinal cut of said one of the plurality of tires interpolatively offset to the at least one longitudinal cut of said another one of the plurality of tires along the face to face relationship.

11. A method of making a railroad crosstie from a plurality of tires, each of said plurality of tires having sidewalls and a central initially treaded section with an outer treaded surface and an inner surface, comprising:
   a. making a first cut through a radial sector at the side of each of said plurality of tires;
   b. removing the sidewalls from the central initially treaded section of each of said plurality of tires;
   c. attaching a cut end of a first one of said plurality of tires to a cut end of a second one of said plurality of tires with the inner surface of each of the first one and the second one of said plurality of tires facing in the same direction to form an extended first layer, wherein the cut end of the first one of said plurality of tires attached to the cut end of the second one of said plurality of tires constitutes an attachment joint of the extended first layer;
   d. attaching a cut end of a third one of said plurality of tires to a cut end of a fourth one of said plurality of tires with the inner surface of each of the third one and the fourth one of said plurality of tires facing in the same direction to form an extended second layer, wherein the cut end of the third one of said plurality of tires attached to the cut end of the fourth one of said plurality of tires constitutes an attachment joint of the extended second layer;
   e. aligning the inner surface of the extended first layer in a face to face relationship with the inner surface of the extended second layer to form an extended opposing set;
   f. making a plurality of the extended opposing sets;

g. stacking the plurality of the extended opposing sets; and h. bundling the plurality of the extended opposing sets to form the railroad crosstie.

12. The method of making a railroad crosstie of claim 11, wherein the attachment joint is secured with staples.

13. The method of making a railroad crosstie of claim 11, wherein the attachment joint of the extended first layer and the attachment joint of the extended second layer are disposed medially.

14. The method of making a railroad crosstie of claim 11, wherein cutting through a radial sector comprises a planar cut in each of the plurality of tires that lies in a plane which excludes an axis of the tire being cut to form a pair of diagonal ends.

15. The method of making a railroad crosstie of claim 14, further comprising removing each of the pair of diagonal ends that are disposed at each end of the extended first layer and the extended second layer.

16. The method of making a railroad crosstie of claim 11, further comprising reducing the thickness of the central initially treaded section.

17. The method of making a railroad crosstie of claim 11, further comprising removing at least a portion of the outer tread surface from the central initially treaded section.

18. The method of making a railroad crosstie of claim 11, further comprising removing an end portion of at least one of the extended first layer and the extended second layer, whereby, the length of the extended first layer approaches the length of the extended second layer.

19. The method of making a railroad crosstie of claim 11, further comprising cutting off at least one exposed end of the railroad crosstie to reduce the length of the railroad crosstie to a predetermined length.

20. A method of making a railroad crosstie of a first length from a plurality of tires of varying diameters, each of said plurality of tires having sidewalls and a central initially treaded section with an outer treaded surface and an inner surface, comprising:

a. making a first cut through a radial sector at the side of each of said plurality of tires;

b. removing the sidewalls from the central initially treaded section of each of said plurality of tires;

c. determining whether a projected flat length of each of the central initially treaded section of each of said plurality of tires is equal to, greater than, or smaller than the first length of a railroad crosstie;

d. aligning the inner surface of the central initially treaded section of one of said plurality of tires with a projected flat length that is equal to or greater than the first length of a railroad crosstie in a face to face relationship with the inner surface of another of said plurality of tires with a projected flat length that is equal to or greater than the first length of a railroad crosstie to form an opposing set;

e. making a plurality of the opposing sets;

f. attaching a cut end of a first one of said plurality of tires having a projected flat length that is smaller than the first length of a railroad crosstie to a cut end of a second one of said plurality of tires having a projected flat length that is smaller than the first length of a railroad crosstie with the inner surface of each of the first one and the second one of said plurality of tires facing in the same direction to form an extended first layer, wherein the cut end of the first one of said plurality of tires and the cut end of the second one of said plurality of tires to which it is attached constitutes an attachment joint of the extended first layer;

g. attaching a cut end of a third one of said plurality of tires having a projected flat length that is smaller than the first length of a railroad crosstie to a cut end of a fourth one of said plurality of tires having a projected flat length that is smaller than the first length of a railroad crosstie with the inner surface of each of the third one and the fourth one of said plurality of tires facing in the same direction to form an extended second layer, wherein the cut end of the third one of said plurality of tires and the cut end of the fourth one of said plurality of tires to which it is attached constitutes an attachment joint of the extended second layer;

h. aligning the inner surface of the extended first layer in a face to face relationship with the inner surface of the extended second layer to form an extended opposing set;

i. making a plurality of the extended opposing sets;

j. interpolatively stacking the plurality of the opposing sets with the plurality of the extended opposing set to form a interpolated stack; and k. bundling the interpolated stack to form the railroad crosstie.

21. The method of making a railroad crosstie of claim 20, further comprising the step of reducing the length of each opposing set and each extending opposing set to the first length of a railroad crosstie.

22. A method of making a railroad crosstie from a plurality of tires, each of said plurality of tires having sidewalls and a central initially treaded section with an outer treaded surface and an inner surface, comprising:

a. making a first cut through a radial sector at the side of each of said plurality of tires;

b. removing the sidewalls from the central initially treaded section of each of said plurality of tires;

c. removing at least a portion of the outer tread surface from the central initially treaded section;

d. aligning the inner surface of the central initially treaded section of a first one of said plurality of tires in a face to face relationship with the inner surface of a second one of said plurality of tires to form a core set having two outer surfaces;

e. aligning the inner surface of the central initially treaded section of another of said plurality of tires in a face to face relationship with one of the two outer surfaces of the core set, and aligning the inner surface of the central initially treaded section of one other of said plurality of tires in a face to face relationship with the other of the two outer surfaces of the core set;

f. repeating the forgoing step a predetermined number of times to form an expanded core set; and g. bundling the expanded core set to form the railroad crosstie.

23. A method of making a railroad crosstie from a plurality of tires, each of said plurality of tires having sidewalls and a central initially treaded section with an outer treaded surface and an inner surface, comprising:

a. making a first cut through a radial sector at the side of each of said plurality of tires;

b. removing the sidewalls from the central initially treaded section of each of said plurality of tires;

c. making at least one longitudinal cut on the inner surface of the central initially treaded section of each of the plurality of tires, said at least one longitudinal cut does not extend all the way through the central initially treaded section;

d. stacking the plurality of each of said plurality of tires; and e. bundling the plurality of opposing sets to form the railroad crosstie.

24. The method of making a railroad crosstie of claim 23, wherein stacking the plurality of each of said plurality of tires comprises:

a. aligning the inner surface of the central initially treaded section of a first one of said plurality of tires in a face to face relationship with the inner surface of a second one of said plurality of tires to form a core set having two outer surfaces;

b. aligning the inner surface of the central initially treaded section of another of said plurality of tires in a face to face relationship with one of the two outer surfaces of the core set, and aligning the inner surface of the central initially treaded section of one other of said plurality of tires in a face to face relationship with the other of the two outer surfaces of the core set; and c. repeating the forgoing step to form an expanded core set.

* * * * *